US011165669B2

(12) United States Patent
Krayden et al.

(10) Patent No.: US 11,165,669 B2
(45) Date of Patent: Nov. 2, 2021

(54) PROVISIONING OF SERVICES IN A COMMUNICATION NETWORK

(71) Applicants: DRIVENETS LTD., Raanana (IL); AT&T SERVICES, INC., Dallas, TX (US)

(72) Inventors: Amir Krayden, Even Yehuda (IL); Yuval Moshe, Tirat Carmel (IL); Anton Gartsbein, Kiryat Tivon (IL); Gal Zolkover, Haifa (IL)

(73) Assignees: DRIVENETS LTD., Raanana (IL); AT&T SERVICES, INC., Dallas, TX (US)

( * ) Notice: Subject to any disclaimer, the term of this patent is extended or adjusted under 35 U.S.C. 154(b) by 0 days.

(21) Appl. No.: 16/617,056

(22) PCT Filed: May 16, 2018

(86) PCT No.: PCT/IL2018/050534
§ 371 (c)(1),
(2) Date: Nov. 26, 2019

(87) PCT Pub. No.: WO2018/220613
PCT Pub. Date: Dec. 6, 2018

(65) Prior Publication Data
US 2020/0153710 A1   May 14, 2020

Related U.S. Application Data

(60) Provisional application No. 62/512,055, filed on May 28, 2017.

(51) Int. Cl.
*H04L 12/24* (2006.01)
*H04L 12/801* (2013.01)
*H04L 12/851* (2013.01)

(52) U.S. Cl.
CPC ...... *H04L 41/5054* (2013.01); *H04L 41/0806* (2013.01); *H04L 47/18* (2013.01); *H04L 47/2408* (2013.01)

(58) Field of Classification Search
CPC . H04L 41/5054; H04L 41/0806; H04L 47/18; H04L 47/2408; H04L 67/10;
(Continued)

(56) References Cited

U.S. PATENT DOCUMENTS 9,026,042 B1 * 5/2015 Nemeth ............... H04B 7/2048
455/12.1
2006/0245356 A1 * 11/2006 Porat ..................... H04L 47/15
370/232

(Continued)

FOREIGN PATENT DOCUMENTS

CN   106357547 A   1/2017

OTHER PUBLICATIONS

Chairman et al., FG IMT-2020: Report on Standards Gap Analysis, 3GPP Draft, SG13-LS139ATT1_PLEN-208, 3rd Partnership Project (3GPP), Mobile Competence Centre; 650, Route Des Lucioles; F-06921 Sophia-Antipolis Cedex; France, Jun. 12, 2016, XP051110522.

(Continued)

*Primary Examiner* — Tesfay Yohannes
(74) *Attorney, Agent, or Firm* — Browdy and Neimark, PLLC

(57) ABSTRACT

An SDN communication system comprising a plurality of White Boxes and a plurality of servers, characterized in that all traffic to/from a plurality of mobile elements, to/from a plurality of broadband communication elements and to/from enterprises, is forwarded after it has been re-arranged based on pre-defined criteria via a single unified cloud, and wherein the unified cloud extends from a plurality of users (Continued)

to a core network, covering a Last Mile network, a Metro network and an Edge network.

19 Claims, 4 Drawing Sheets

(58) Field of Classification Search
CPC . H04L 41/5019; H04L 41/5041; H04L 45/64; H04L 45/04; H04L 45/42
USPC .......................................................... 709/222
See application file for complete search history.

(56) References Cited

U.S. PATENT DOCUMENTS

| | | | |
|---|---|---|---|
| 2007/0121612 A1* | 5/2007 | Nadeau | H04L 67/2852 370/386 |
| 2011/0182198 A1* | 7/2011 | Rittenhouse | H04L 12/12 370/252 |
| 2011/0299543 A1* | 12/2011 | Diab | H04L 63/10 370/401 |
| 2014/0133456 A1 | 5/2014 | Donepudi et al. | |
| 2014/0297766 A1* | 10/2014 | Imes | H04L 51/04 709/206 |
| 2014/0365634 A1 | 12/2014 | Metz et al. | |
| 2014/0378047 A1* | 12/2014 | Kennard | H04B 7/15535 455/22 |
| 2015/0148104 A1* | 5/2015 | Friedl | H04L 63/102 455/561 |
| 2015/0312705 A1* | 10/2015 | Pan | H04M 1/72527 455/41.2 |
| 2017/0026245 A1 | 1/2017 | Rao et al. | |
| 2017/0086191 A1 | 3/2017 | Sipra et al. | |
| 2017/0251515 A1* | 8/2017 | Altman | H04L 61/2503 |
| 2017/0331577 A1* | 11/2017 | Parkvall | H04J 11/0079 |
| 2018/0092139 A1* | 3/2018 | Novlan | H04W 56/001 |
| 2018/0167927 A1* | 6/2018 | Beattie, Jr. | H04W 4/029 |
| 2018/0213410 A1* | 7/2018 | Tang | H04W 24/02 |
| 2018/0288493 A1* | 10/2018 | Hermesh | H04N 21/47202 |
| 2019/0068497 A1* | 2/2019 | Tamura | H04W 36/0069 |

OTHER PUBLICATIONS

Telenor Asa, "IWPC Presentation—Orchestration Vision for Mobile Networks and Open Source MANO (OSM)", ETSI Draft; OSM (16)000056, European Telecommunications Stadnards Institute (ETSI), 650, Route Des Lucioles; F-06921 Sophia-Antipolis; France, vol. ISG—OSM—OpenSource MANO Sep. 2, 2016 (Sep. 2, 2016), pp. 1-39, XP014278127.

Next Generation Protocol (NGP); Scenario Definitions, ETSI Grop Specification, European Telecommunications Standardas Institute (ETSI), 650, Route Des Lucioles; F-06921, vol. NGP, No. V1.2.1 May 9, 2017 (May 9, 2017, pp. 1-1126, XP014290916.

Akihiro Nakao 5GMF/The Universty of Tokyo Japan: IMT-2020, Network Softwarization; IMT-O-041, ITU-T Draft; Study Period 2017-2020; Study Group 13; Series IMT-O-041, International Telecommunication Union, Geneva; CH, vol. 21/13 Feb. 8, 2017 (Feb. 8, 2017), pp. 1-60, XP044193593.

Larry Petterson et al., Central Office Re-Architected as a Data Center, IEEE Communications Magazine, Oct. 1, 2016 (Oct. 1, 2016), pp. 96-101, XP055399082.

* cited by examiner

PROVISIONING OF SERVICES IN A COMMUNICATION NETWORK

TECHNICAL FIELD

The present disclosure generally relates to the field of communication systems. More particularly, the present disclosure relates to the provisioning of services in communication networks.

Glossary

CE—Customer Equipment
FE—Forwarding Engine
LAN—Local Area Network
NB—Northbound
PE—Provider Edge
RE—Routing Engine
Data Path Service—a service provided by all Forwarding Engines (FEs) which are responsible to forward all the packets arriving at the data path plane towards the CEs, PEs and Core routers, and implement the data path features e.g. QoS, ACL, packets' classification, and the like.
Edge network—a network which provides an entry point into enterprise or service provider core networks. Devices of Edge network include among others routers, routing switches, integrated access devices (IADs), multiplexers, and a variety of metropolitan area network (MAN) and wide area network (WAN) access devices. As the Edge network is exposed to the public Internet, it acts as a gateway to various platform services.
Management Service—a service provided by a managing entity (Manager) which is responsible for the system configuration and monitoring its performance, where its Northbound (NB) elements are used for providing control and administration functionality.
Last Mile network—refers to the final leg of the communications network that delivers communication services to retail end-users (customers). More specifically, the last mile refers to the portion of the communications network chain that physically reaches the end-user's premises. Examples are the copper wire subscriber lines connecting landline telephones to the local telephone exchange; coaxial cable service drops carrying cable television signals from utility poles to subscribers' homes, and cell towers linking local cell phones to the cellular network.
Merchant Silicon—refers to a marketing term which typically used to denote "off the shelf" chip components used for manufacturing a networking product.
Metro network—commonly used to connect subscribers to a larger service network or to the Internet. Enterprises also use this type of network to connect their own offices to each other. The network is used to connect Last Mile networks which comprise access devices that are normally located at a customer's premises, unit, or wireless base station with or without aggregating traffic received from the Last Mile networks, to core network.
Routing Service—a service provided by a Routing Engine (RE) which is responsible for using the appropriate routing protocol from among all routing protocols supported by the system, when communicating with specific CEs, PEs and Core routers, and optionally controlling and synchronizing certain data path related features such as distributed QoS.
White Box—a commodity, being an open or industry-standard compliant hardware for switches and/or routers within the forwarding plane. White boxes provide users with the foundational hardware elements of a network. One optional building component of a White Box may be a Merchant Silicon product (see above).

BACKGROUND

Software-defined networking (hereinafter "SDN") is a concept whereby one is able to dynamically initialize, control, change, and manage network behavior through programming of open interfaces and abstraction of lower-level functionality. SDN is meant to address the fact that the static architecture of traditional networks does not support a dynamic, scalable computing and storage needs of modern computing environments such as data centers. This is done by decoupling or disassociating the system that makes decisions on where traffic is being sent (the SDN controller, or the control plane) from the underlying systems that forward traffic to the selected destination (the data plane).

The SDN architecture is a dynamic, manageable, cost-effective, and adaptable architecture, that aims to be suitable for the high-bandwidth, dynamic nature of today's applications. Typical SDN architectures decouple network control and forwarding functions, enabling network control to become directly programmable and the underlying infrastructure to be abstracted from applications and network services.

The vast, ever-increasing number of mobile devices and content, server virtualization, and advent of cloud services are among the trends driving the networking industry to re-examine traditional network architectures. Many conventional networks are hierarchical, built with tiers of Ethernet switches arranged in a tree-like structure. This design made sense when client-server computing was dominant, but such a static architecture is not to the dynamic computing and storage needs of today's enterprise data centers, and carrier environments.

The following list relates to various elements comprising such a network architecture:
SDN Application
SDN Applications are programs that communicate their network requirements and desired network behavior directly to the SDN Controller via a northbound interface ("NBI"). In addition, they may consume an abstracted view of the network for their internal decision-making purposes. An SDN Application typically consists of one SDN Application Logic and one or more NBI Drivers. SDN Applications may themselves expose another layer of abstracted network control, thus offering one or more higher-level NBIs through respective NBI agents.
SDN Controller
The SDN Controller is a logically centralized entity in charge of (i) translating the requirements from the SDN Application layer down to the SDN Datapaths and (ii) providing the SDN Applications with an abstract view of the network (e.g. statistics and events). An SDN Controller consists of one or more NBI Agents, the SDN Control Logic, and the Control to Data-Plane Interface ("CDPI") driver.
SDN Datapath
The SDN Datapath is a logical network device (or a physical device as is for example the case when a White Box device is used) that exposes visibility and control over its advertised forwarding and data processing capabilities. The representation may encompass all or a subset of the physical substrate resources. An SDN Datapath comprises a CDPI agent and a set of one or more traffic forwarding engines and optionally one or more traffic processing functions. These engines and functions may include simple forwarding between the datapath's external interfaces or internal traffic processing or termination functions. One or more SDN Datapaths may be contained in a single (physical) network element—an integrated physical combination of communications resources, managed as a single unit. An SDN Datapath may also be defined across multiple physical network elements.

SDN Control to Data-Plane Interface (CDPI)

The SDN CDPI is the interface defined between an SDN Controller and an SDN Datapath, which provides (i) programmatic control of all forwarding operations, (ii) capabilities advertisement, (iii) statistics reporting, and (iv) event notification.

SDN Northbound Interfaces (NBI)

SDN NBIs are interfaces placed between SDN Applications and SDN Controllers. They typically provide abstract network views and enable direct expression of network behavior and requirements.

SDN Control Plane

Initial SDN control plane proposals focused on a centralized solution, where a single control entity has a global view of the network. While this simplifies the implementation of the control logic, it has scalability limitations as the size and dynamics of the network increase. To overcome these limitations, several approaches have been proposed in the art that fall into two categories, hierarchical and fully distributed approaches. In hierarchical solutions, distributed controllers operate on a partitioned network view, while decisions that require network-wide knowledge are taken by a logically centralized root controller. In distributed approaches, controllers operate on their local view or they may exchange synchronization messages enabling them to enhance their knowledge. Distributed solutions are more suitable for supporting adaptive SDN applications. A key issue when designing a distributed SDN control plane is to decide on the number and placement of control entities. One important factor that should be taken into account while taking such decisions is the delay associated with the propagation of communication between the controllers and the network devices, especially in large networks. Other factors involve control path reliability, fault tolerance, and application requirements.

A vast number of communication networks are currently used worldwide by service providers. FIG. 1 illustrates a schematic view of such a typical prior art communication network as currently used by service providers. It may be seen from this typical network, that the service provider uses in the case demonstrated in this figure, three separate infrastructures in order to be able provide the required services. These infrastructures extend from the customers, i.e. the last mile section of the network, via a metro section to an edge section of the provider network. In such a network, the transport layer is typically L2 layer and as will be appreciated by those skilled in the art, the network has a limited bandwidth reservation capability for allocating bandwidth to various customers. At the same time, the devices are limited in their ability to buffer traffic packets received, consequently creating a problem when the respective devices are subjected to micro (or larger) bursts of packets received thereat. As a result of the above, when the capacity of traffic being received exceeds a pre-defined threshold, packets will be blindly dropped, having an adverse effect upon the usage experience of the customers.

Thus, there is a need to find a solution that overcomes the above-described shortcomings.

SUMMARY

The disclosure may be summarized by referring to the appended claims.

It is an object of the present disclosure to provide a solution that is capable of reducing dramatically expenses associated with both the price of the required equipment and infrastructure as well as the operating costs, by using commodity hardware and implementing a software based centralized control rather than using expensive ASIC based routers, and eliminate the use of a plurality of infrastructures for conveying different types of traffic from one destination to another.

It is another object of the disclosure to provide a solution whereby network services/capacity agility is increased when using a software-based solution.

It is another object of the disclosure to provide a method and a system adapted to enable slicing and combining traffic flows in accordance with pre-defined criteria (e.g. per customers' SLA, security level, service type etc.), thereby enabling to improve both the user experience as well as the network agility, all without adversely affecting the QoS of the traffic being conveyed.

It is yet another object of the disclosure to provide a solution that enables managing traffic in a single Metro-Cloud rather than using three individual networks (Mobility, Broadband and Enterprise) for forwarding the very same traffic.

It is another object of the disclosure to provide a solution that enables the use of White Boxes under centralized control, thereby providing them with L3/Services capabilities.

Other objects of the present disclosure will become apparent from the following description.

According to a first embodiment of the present disclosure, there is provided an SDN communication system comprising a plurality of White Boxes and a plurality of servers, characterized in that all traffic to/from a plurality of mobile elements, to/from a plurality of broadband communication elements and to/from enterprises, is forwarded after it has been re-arranged based on pre-defined criteria via a single unified cloud, preferably without adversely affecting the QoS of the traffic being conveyed, and wherein the unified cloud extends from a plurality of users to a core network, covering a Last Mile network, a Metro network and an Edge network.

According to another embodiment, the single unified cloud is configured to enable provisioning of metro and/or mobility and/or broadband services via a distributed metro cloud.

By yet another embodiment, the single unified cloud is configured to enable provisioning of edge and/or aggregating and/or core services via a centralized core cloud.

According to still another embodiment, the SDN communication system further comprising one or more buffers configured to buffer micro bursts of received traffic.

By yet another embodiment, the SDN communication system further comprising at least one router for hairpinning traffic before leaving the single unified cloud towards a respective core network. The term "router" as used herein throughout the specification and claims is used also to encompass any applicable device/mechanism that is used to enable routing traffic (e.g. local traffic) by the closest element capable of carrying out that functionality.

In accordance with another embodiment, the SDN communication system further comprising a processor operative to add one or more indications to communication packets included in traffic flows being routed in the SDN communication system.

According to still another embodiment, the one or more indications are associated with at least one respective characteristic of said communication packets.

By yet another embodiment, the at least one respective characteristic of the communication packets is a member of a group that consists of: security level associated with traffic to which communication packets belong; customer service level agreement associated with traffic to which communication packets belong; service type of traffic to which communication packets belong; and protocol type associated with traffic to which communication packets belong.

In accordance with another embodiment, the SDN communication system further comprising a processor configured to re-arrange traffic received, so that at least one of the traffic flows comprises only communication packets that meet one or more pre-defined criteria.

According to another embodiment, the SDN communication system comprises a processor configured to determine how should traffic received be re-arranged, so that at least one of the traffic flows comprises only communication packets that meet one or more pre-defined criteria, and a respective controller for implementing the determination made by that processor.

By still another embodiment, the processor configured to re-arrange traffic so that at least one of the traffic flows comprises only communication packets that meet one or more pre-defined criteria is located at at least one end of the single unified cloud to enable forwarding traffic in re-arranged flows throughout the single unified cloud.

According to another embodiment, the processor configured to re-arrange traffic so that at least one of the traffic flows comprises only communication packets that meet one or more pre-defined criteria, is located between said metro network part and said edge network part of the single unified cloud to enable retrieving packets from their respective re-arranged traffic flows to different re-arranged flows for their conveyance throughout the remaining of their path within that single unified cloud.

In accordance with still another embodiment, the SDN communication system comprises at least two processors each configured to re-arrange traffic so that at least one of the traffic flows comprises only communication packets that meet one or more pre-defined criteria, wherein at least one of the two processors is located at at least one end of the single unified cloud and at least one other of the at least two processors is located within the single unified cloud to enable retrieving packets from their respective re-arranged traffic flows to different re-arranged flows for their conveyance throughout the remaining of their path within that single unified cloud, thereby providing an end-to-end management of the traffic being conveyed.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps, not all of which are required in all embodiments of the invention. The scope of the invention can be summarized by referring to the appended claims.

Figure 1:
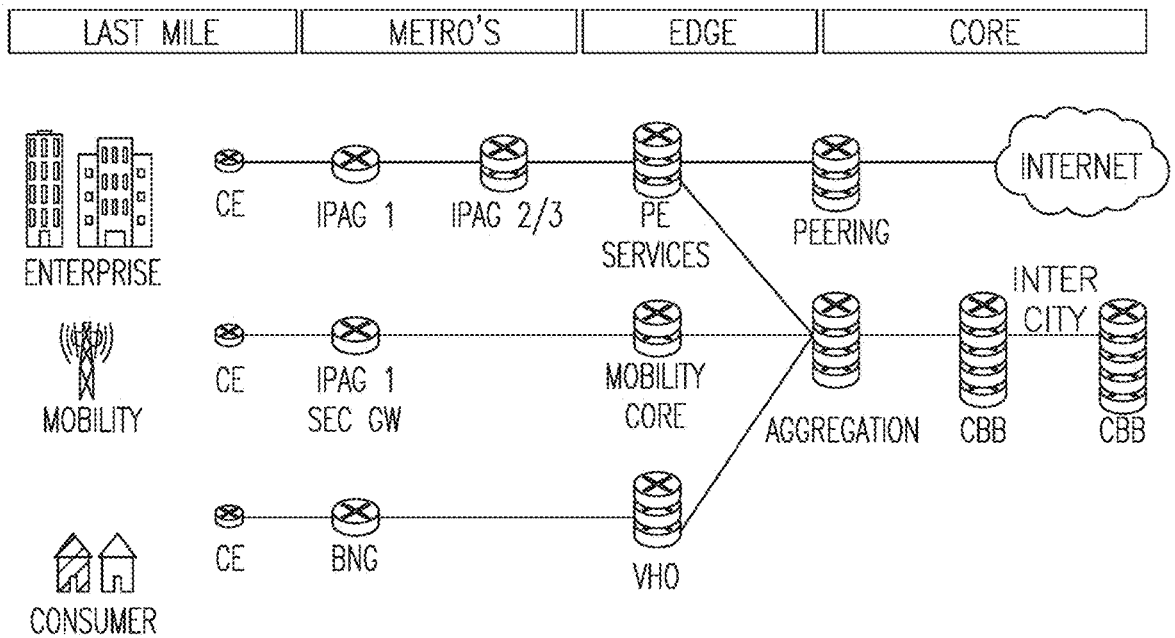
FIG. 1 illustrates a schematic view of a typical prior art communication network as currently used by service providers.
Figure 2:
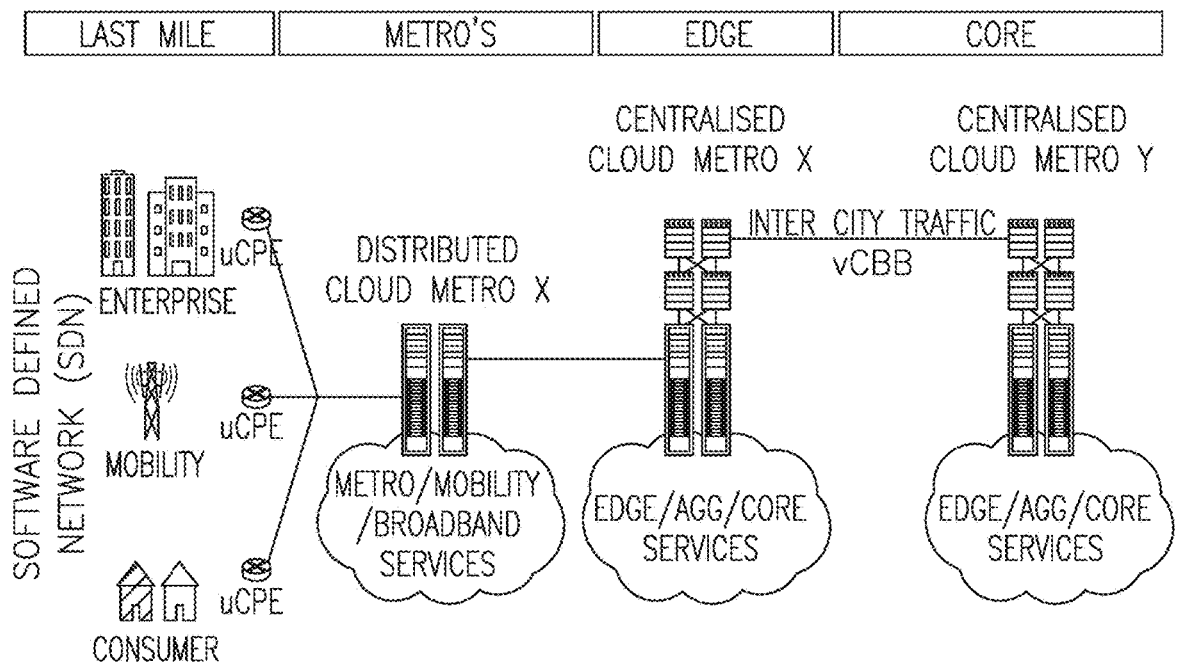
FIG. 2 exemplifies a solution construed in accordance with an embodiment of the present disclosure.

FIG. 2 illustrates a schematic presentation of a communication system construed in accordance with the present invention that is operative in a network such as an SDN. The communication system illustrated in this extends comprises three main sub-networks. The first being the last mile part, which comprises the customers' premises equipment (CPEs) and various equipment that may be installed at a geographical proximity of the respective customers' equipment. The term "CPE" as used herein refers generally to devices such as telephones, routers, switches, residential gateways (RG), set-top boxes, fixed mobile convergence products, home networking adapters and Internet access gateways that enable consumers to access communications service providers' services and distribute them around their house via a local area network (LAN). The CPE is usually located at the subscriber's premises and connected with a carrier's telecommunication channel at the demarcation point to separate customer equipment from the equipment located in either the distribution infrastructure or central office of the communications service provider.

The next sub-network part of the communication network illustrated in this Fig. is a metro sub-network, which comprises a plurality of servers and is configured in one or more distributed clouds (CloudMetro X) configuration.

Some of the advantages provided by the present invention solution as exemplified in this FIG. 2, are:

A unified infrastructure for carrying out any service and for every segment of the network;

A solution that does not rely on using the layer 2 (L2) transport layer;

Offers control of bandwidth reservation and usage for various customers;

Offers an additional feature whereby micro bursts may be buffered; and

When capacity of the traffic being conveyed exceeds a pre-determined threshold, packets may be dropped on a selective basis.

Figure 3:
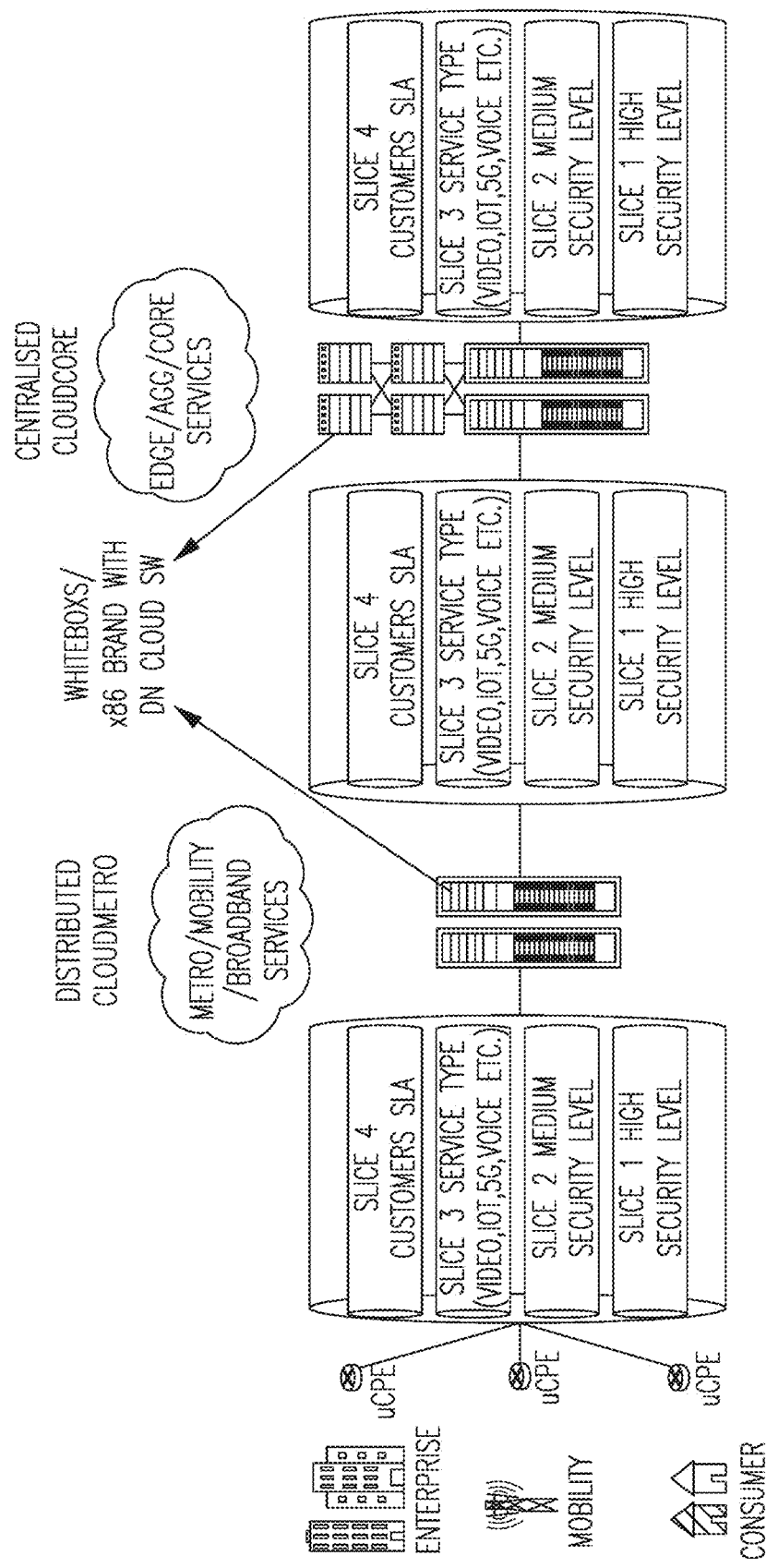
FIG. 3 exemplifies a solution construed in accordance with an embodiment of the present disclosure that enables re-arranging (slicing) received traffic in accordance with pre-defined criteria.

FIG. 3 demonstrates a method for providing services in a communication network, such as the one exemplified in FIG. 2. As already described hereinabove, the solution of the present invention provides an architecture that enables the operator to extract packets from the traffic being conveyed based on pre-defined criteria and to group them in a stream that comprises other packets that meet the same criterion as that which a respective extracted packet has, in other words, carrying out traffic slicing based on one or more pre-defined criteria.

The method enables slicing the traffic for example based on the SLA (service level agreement) of the customers, based on the required security level and/or based on the service type. By carrying out this method, it improves the user experience and at the same time the network agility.

In addition, the solution provided herein enables a dramatic reduction in the expenses of the operator (both capex & opex expenses) by managing a single MetroCloud rather than having to manage three separate metro networks (a mobile network, a broadband network and an enterprise network) as is the case nowadays.

In order to achieve the above-described advantages, the solution provided herein provides for re-arranging traffic being conveyed in a unified cloud discussed above in the SDN communication system, based on one or more pre-defined criteria.

For example:

Slicing traffic per security level required;

Slicing traffic per customer SLA;

Slicing traffic per service type (e.g. video, IOT, 5G, voice etc.)

Slicing traffic per protocol/services (Video/TCP).

One way of implementing this solution is by having a processor which is adapted to add one or more indications to communication packets included in traffic flows being routed in the SDN communication system, so that when these communication packets are forwarded, the one or more indication will be used by the appropriate forwarding engines to have the communication packets forwarded in accordance with the pre-defined criterion associated with each respective indication.

Reduction in transport and edge/core expenses may also be affected by implementing hairpinning of traffic conveyed in the metro network. The term "hairpinning" as used herein is used to denote a scenario where traffic arrives from one source to a router (or a similar device), makes a U-turn and returns the same way it came. In other words, this technique relates to cases for example where a machine on a LAN is able to access another machine on the LAN via an external IP address of the LAN/router (with port forwarding set up on the router to direct requests to the appropriate machine on the LAN).

Figure 4:
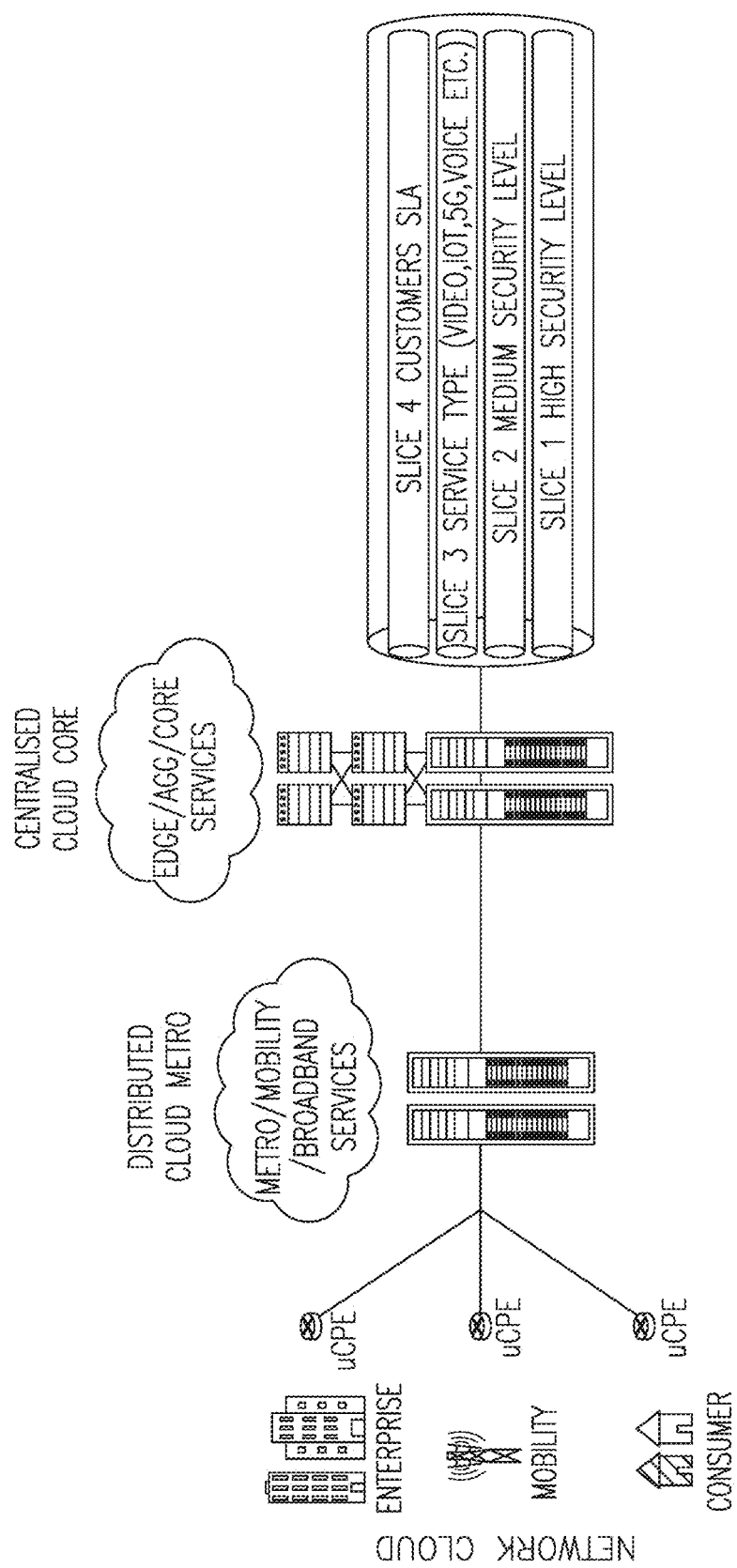
FIG. 4 demonstrates an embodiment of the invention where traffic is rearranged at one end of a single unified cloud (the core network end) and conveyed in its rearranged form throughout the single unified cloud.

FIG. 4 illustrates an embodiment of the present invention that enables the operator to provide a secured core capacity and traffic conveyance according to inter-city SLA. Thus, by implementing the solution of the present invention, the operator may reduce dramatically the expenses involved in purchasing hardware network devices.

Figure 5:
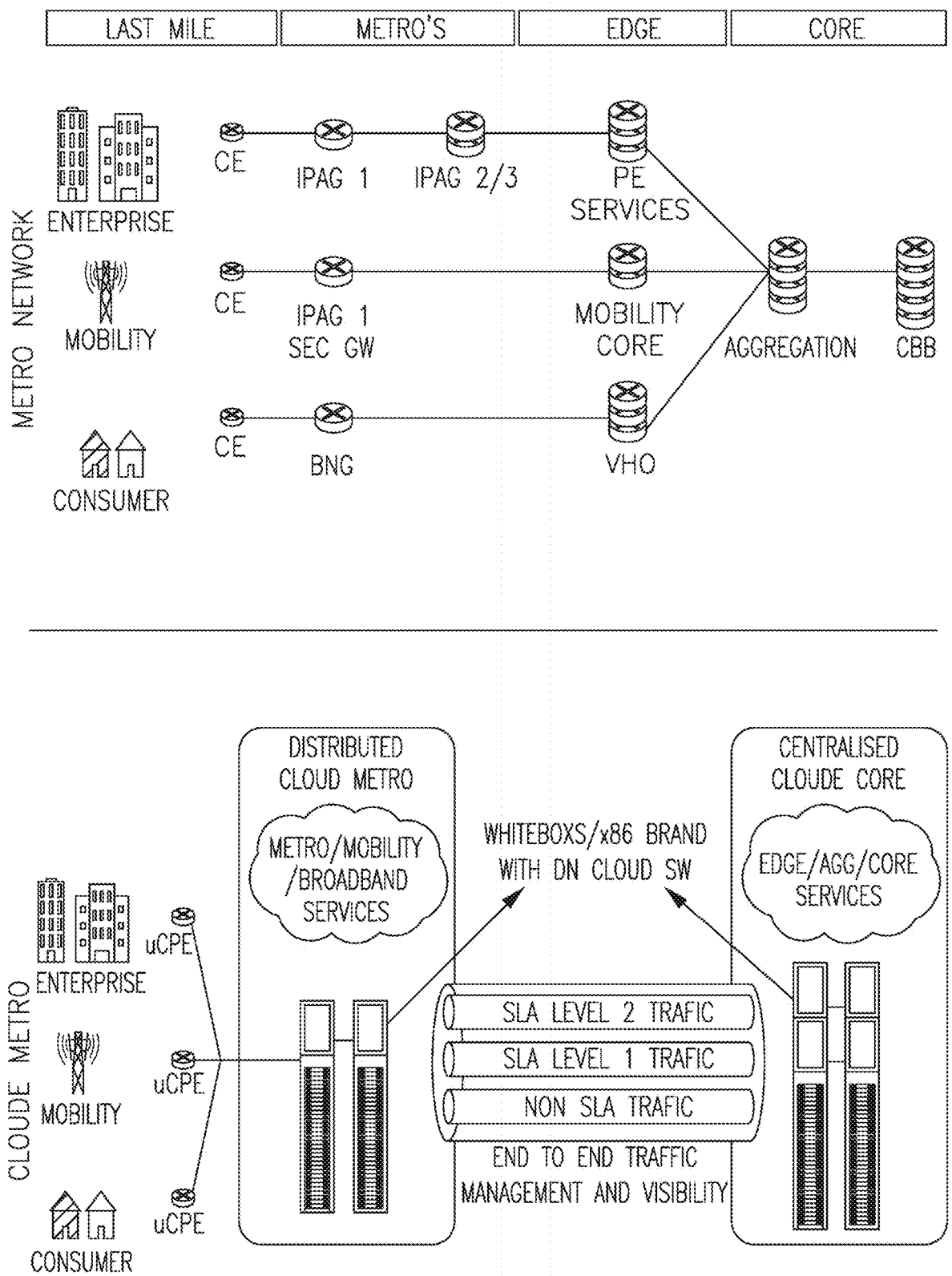
FIG. 5 demonstrates another embodiment of the invention where traffic is rearranged within the single unified cloud.

FIG. 5 presents a network construed in accordance with the present invention configured in an architecture that enables slicing the traffic being conveyed per one or more pre-defined criteria. The network demonstrated in this FIG. comprises White Boxes that are subjected to centralized control and are provided with a L3/Services capability. In addition, the solution according to this embodiment demonstrates a network that enables the use of a segment routing protocol (or any other applicable standard) for conveying the traffic. Segment routing being a standard that simplifies MPLS networks, which has the benefits of enabling the interfacing with software-defined networks (SDNs) and allows for source-based routing.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An SDN communication system comprising a plurality of white boxes and a plurality of servers connected therebetween, wherein the SDN communication system's control is programmable and the underlying infrastructure is abstracted from applications and network services, wherein said SDN communication system is configured to provide services to a plurality of mobile elements, and wherein said SDN communication system is characterized in that:
   a) all traffic being forwarded to said plurality of mobile elements, and/or to a plurality of broadband communication elements and/or to enterprises, is forwarded after it has been re-arranged based on pre-defined criteria via a single unified cloud;
   b) said single unified cloud being a software based centralized control, for forwarding traffic via said single unified cloud extending from a first end comprising a plurality of end-users to a second end comprising a core network, covering a last mile sub-network, a metro sub-network and an edge sub-network; and
   wherein the SDN communication system comprises at least two processors each configured to re-arrange traffic so that at least one of the traffic flows comprises only communication packets that meet the one or more pre-defined criteria, and wherein at least one of the two processors is located at, at least one end of the single unified cloud for conveying said at least one of the traffic flows via a path within said single unified cloud, and
   wherein said single unified cloud is configured to enable provisioning of metro and/or mobility and/or broadband services via said metro sub-network, wherein said metro sub-system comprises a distributed metro cloud.

2. An SDN communication system comprising a plurality of white boxes and a plurality of servers connected therebetween, wherein the SDN communication system's control is programmable and the underlying infrastructure is abstracted from applications and network services, wherein said SDN communication system is configured to provide services to a plurality of mobile elements, and wherein said SDN communication system is characterized in that:
   a) all traffic being forwarded to said plurality of mobile elements, and/or to a plurality of broadband communication elements and/or to enterprises, is forwarded after it has been re-arranged based on pre-defined criteria via a single unified cloud;
   b) said single unified cloud being a software based centralized control, for forwarding traffic via said single unified cloud extending from a first end comprising a plurality of end-users to a second end comprising a core network, covering a last mile sub-network, a metro sub-network and an edge sub-network; and
   wherein the SDN communication system comprises at least two processors each configured to re-arrange traffic so that at least one of the traffic flows comprises only communication packets that meet the one or more pre-defined criteria, and wherein at least one of the two processors is located at, at least one end of the single unified cloud for conveying said at least one of the traffic flows via a path within said single unified cloud, and wherein said single unified cloud is configured to enable provisioning of edge and/or aggregating and/or core services via said edge sub-system, wherein said edge sub-network comprises a centralized core cloud.

3. The SDN communication system of claim 1, further comprising one or more buffers located at a respective white box of said plurality of white boxes or a server, configured to buffer micro bursts of received traffic.

4. The SDN communication system of claim 1, wherein said pre-defined criteria for re-arranging traffic prior to forwarding the re-arranged traffic via said single unified cloud, is selected from among a group that consists of:
slicing traffic per security level required;
slicing traffic per customer SLA;
slicing traffic per service type; and
slicing traffic per protocol.

5. The SDN communication system of claim 1, further comprising a processor operative to add one or more indications to communication packets included in traffic flows being routed in the SDN communication system.

6. The SDN communication system of claim 5, wherein the one or more indications are associated with at least one respective characteristic of said communication packets.

7. The SDN communication system of claim 6, wherein the at least one respective characteristic of said communication packets is a member of a group that consists of: security level associated with traffic to which communication packets belong; customer service level agreement associated with traffic to which communication packets belong; service type of traffic to which communication packets belong; and protocol type associated with traffic to which communication packets belong.

8. The SDN communication system of claim 1, wherein said at least one of the two processors is configured to re-arrange traffic received, so that at least one of the traffic flows comprises only communication packets that meet one or more pre-defined criteria.

9. The SDN communication system of claim 8, wherein said processor configured to re-arrange traffic so that at least one of the traffic flows comprises only communication packets that meet one or more pre-defined criteria, is located at, at least one end of the single unified cloud to enable forwarding traffic in re-arranged flows throughout the single unified cloud.

10. The SDN communication system of claim 1, further comprising a processor configured to re-arrange traffic so that at least one of the traffic flows comprises only communication packets that meet one or more pre-defined criteria, is located between said metro network part and said edge network part of the single unified cloud to enable retrieving packets from their respective re-arranged traffic flows and insert them at different re-arranged flows for their conveyance throughout the remaining of their path within said single unified cloud.

11. The SDN communication system of claim 1, further comprising at least two processors each configured to re-arrange traffic flows so that at least one of the traffic flows comprises only communication packets that meet one or more pre-defined criteria, wherein at least one of the two processors is located at, at least one end of the single unified cloud and at least one other of the at least two processors is located within the single unified cloud to enable retrieving packets from their respective re-arranged traffic flows to different re-arranged flows for their conveyance throughout the remaining of their path within that single unified cloud, thereby providing an end-to-end management of the traffic being conveyed.

12. The SDN communication system of claim 4, further comprising at least one router located at a respective white box of said plurality of white boxes or a server for hairpinning traffic received from the plurality of mobile elements and/or the plurality of broadband communication elements and/or the enterprises, conveyed via said single unified cloud, before leaving the single unified cloud towards said core network.

13. The SDN communication system of claim 2, further comprising one or more buffers located at a respective white box of said plurality of white boxes or a server, configured to buffer micro bursts of received traffic.

14. The SDN communication system of claim 2, further comprising a processor operative to add one or more indications to communication packets included in traffic flows being routed in the SDN communication system.

15. The SDN communication system of claim 14, wherein the one or more indications are associated with at least one respective characteristic of said communication packets.

16. The SDN communication system of claim 15, wherein the at least one respective characteristic of said communication packets is a member of a group that consists of: security level associated with traffic to which communication packets belong; customer service level agreement associated with traffic to which communication packets belong; service type of traffic to which communication packets belong; and protocol type associated with traffic to which communication packets belong.

17. The SDN communication system of claim 2, wherein said at least one of the two processors is configured to re-arrange traffic received, so that at least one of the traffic flows comprises only communication packets that meet one or more pre-defined criteria.

18. The SDN communication system of claim 2, further comprising a processor configured to re-arrange traffic so that at least one of the traffic flows comprises only communication packets that meet one or more pre-defined criteria, is located between said metro network part and said edge network part of the single unified cloud to enable retrieving packets from their respective re-arranged traffic flows and insert them at different re-arranged flows for their conveyance throughout the remaining of their path within said single unified cloud.

19. The SDN communication system of claim 2, further comprising at least two processors each configured to re-arrange traffic flows so that at least one of the traffic flows comprises only communication packets that meet one or more pre-defined criteria, wherein at least one of the two processors is located at, at least one end of the single unified cloud and at least one other of the at least two processors is located within the single unified cloud to enable retrieving packets from their respective re-arranged traffic flows to different re-arranged flows for their conveyance throughout the remaining of their path within that single unified cloud, thereby providing an end-to-end management of the traffic being conveyed.

* * * * *